United States Patent
Rutkowski et al.

(10) Patent No.: US 10,207,611 B2
(45) Date of Patent: Feb. 19, 2019

(54) METHOD FOR STABILIZING AND/OR FOR REDUCING TENSIONS OCCURRING WITHIN THE WALL-LIKE STRUCTURE BY MEANS OF LASER WELDING

(71) Applicant: SITECH SITZTECHNIK GMBH, Wolfsburg (DE)

(72) Inventors: Dawid Rutkowski, Lubin (PL); Robert Sulowski, Jaczow (PL)

(73) Assignee: SITECH SITZTECHNIK GMBH, Wolfsburg (DE)

( * ) Notice: Subject to any disclaimer, the term of this patent is extended or adjusted under 35 U.S.C. 154(b) by 535 days.

(21) Appl. No.: 14/984,677

(22) Filed: Dec. 30, 2015

(65) Prior Publication Data

US 2016/0107554 A1    Apr. 21, 2016

Related U.S. Application Data

(63) Continuation of application No. PCT/EP2014/069085, filed on Sep. 8, 2014.

(30) Foreign Application Priority Data

Sep. 9, 2013    (DE) .......................... 10 2013 217 969

(51) Int. Cl.
*B23K 26/60* (2014.01)
*C21D 9/46* (2006.01)
(Continued)

(52) U.S. Cl.
CPC .............. *B60N 2/686* (2013.01); *C21D 1/09* (2013.01); *C21D 1/30* (2013.01); *C21D 9/0068* (2013.01);
(Continued)

(58) Field of Classification Search
CPC ........ B60N 2/686; C21D 1/09; C21D 9/0068; C21D 1/30; C21D 9/46; C21D 9/50; B23K 26/00; B23K 26/60
(Continued)

(56) References Cited

U.S. PATENT DOCUMENTS 8,272,681 B2    9/2012    Gücker et al.
8,716,624 B2 *  5/2014    Johnson ................. B21D 5/086
                                                219/121.64
(Continued)

FOREIGN PATENT DOCUMENTS

DE          196 47 097 C1    8/1998
DE    10 2004 044 359 A1    3/2006
(Continued)

*Primary Examiner* — Samuel M Heinrich
(74) *Attorney, Agent, or Firm* — Muncy, Geissler, Olds & Lowe, P.C.

(57) ABSTRACT

A method for targeted influencing of the deformation behavior of a wall-like structure, in particular a rear wall structure of a vehicle seat, which structure is heated in at least one region at least section by section by means of a laser light source. According to the invention at least one region which influences a strength and/or a tension of the wall-like structure is selectively chosen and is lasered for increasing the strength of the wall-like structure and/or for reducing tensions within the wall-like structure. The wall-like structure is characterized in that in a selectively chosen region the structure has at least one laser-welded seam which is generated by a laser light source of a laser device, increases the strength of the wall-like structure and/or reduces tensions in the wall-like structure.

15 Claims, 4 Drawing Sheets

(51) Int. Cl.
    *C21D 9/50*     (2006.01)
    *B60N 2/68*     (2006.01)
    *C21D 9/00*     (2006.01)
    *C21D 1/09*     (2006.01)
    *C21D 1/30*     (2006.01)

(52) U.S. Cl.
    CPC ...... *B60N 2205/35* (2013.01); *C21D 2221/00* (2013.01)

(58) Field of Classification Search
    USPC ............... 219/121.64, 121.85; 148/525, 565
    See application file for complete search history.

(56) References Cited

U.S. PATENT DOCUMENTS

| 9,783,865 | B2* | 10/2017 | Sachdev | C21D 8/0263 |
| 2008/0138233 | A1* | 6/2008 | Tomita | C21D 6/002 |
| | | | | 420/61 |
| 2012/0273089 | A1* | 11/2012 | Sakkinen | B60N 2/0722 |
| | | | | 148/218 |
| 2012/0325379 | A1* | 12/2012 | Baulig | B23K 15/0053 |
| | | | | 148/518 |

FOREIGN PATENT DOCUMENTS

| DE | 10 2004 048 350 A1 | 4/2006 |
| DE | 10 2006 016 348 A1 | 10/2007 |
| DE | 10 2007 024 797 A1 | 11/2008 |
| DE | 10 2010 005 652 A1 | 7/2011 |
| DE | 10 2011 101 700 A1 | 6/2012 |
| DE | 10 2011 101 991 B3 | 8/2012 |
| DE | 10 2011 016 100 A1 | 10/2012 |
| KR | 2012 0091327 A | 8/2012 |
| WO | wo 99/19164 A1 | 4/1999 |

* cited by examiner

METHOD FOR STABILIZING AND/OR FOR REDUCING TENSIONS OCCURRING WITHIN THE WALL-LIKE STRUCTURE BY MEANS OF LASER WELDING

This nonprovisional application is a continuation of International Application No. PCT/EP2014/069085, which was filed on Sep. 8, 2014, and which claims priority to German Patent Application No. 10 2013 217 969.3, which was filed in Germany on Sep. 9, 2013, and which are both herein incorporated by reference.

BACKGROUND OF THE INVENTION

Field of the Invention

The invention relates to a method for stabilizing a rear-wall structure in a seat structure, and a seat structure, producible by the method, with selectively determined laser-strengthened regions in the area of a rear wall.

Description of the Background Art

DE 10 2007 024 797 A1, which corresponds to U.S. Pat. No. 8,272,681, discloses a method for producing a profile component from a semifinished sheet metal part, which has a structurally increased strength at least in sections. The semifinished sheet metal part is formed in an at least single-stage bending process. The bending process with the subsequent separating and cutting operations on the semi-finished sheet metal part is combined with a thermal treatment of the at least one spatially delimited region of the semifinished sheet metal part. The thermal treatment comprises at least one heating step and one cooling step following it. The at least one spatially delimited region has a structurally increased strength after cooling. Profile components with an open, with a partially open, or also with a completely closed profile cross section and with hardness properties adapted in a directed manner can be produced by the process. It is possible to produce a profile component, which in sections has hardened regions and in sections non-hardened regions. The hardened regions can be partially hardened, completely hardened, or also partially hardened in sections and completely hardened in sections. For example, the forming of the profile component in DE 10 2007 024 797 A1 occurs by roll profiling and the heating of locally defined regions for strengthening these regions occurs before, during, or after the forming.

The local spatial heating of the semifinished sheet metal part can be achieved advantageously by the inductive generation of an electromagnetic field or by a conductive current flow by means of the electrical resistance (or by a combination of these two processes), therefore, by dissipation of electrical energy. In other embodiments, there is also the possibility that the heat is introduced into defined regions of the semifinished sheet metal part by one or more laser light sources, by an infrared radiation source, or by means of a gas burner. Laser light sources have the advantage that the laser light generated by them can be focused, for example, by simple means also on a relatively small spatially delimited region of the semifinished sheet metal part to bring about local heating to the desired temperature in this region.

In the so-called laser strengthening, in which regions, hardened at least in sections, in the profile component can be created, a carbon steel is heated for short time above the austenitizing temperature and converted by rapid cooling to the harder martensitic microstructure. In this regard, the heat is produced via the absorption of the laser radiation on the surface. The quenching occurs by heat conduction into the material interior. The hardening depth in laser strengthening is limited by the heat transport and self-quenching. The temporal temperature profile is determined substantially by the spot geometry of the laser beam at the machining site and the rate of advance of the laser beam relative to material. Laser sources often used in welding and laser strengthening are primarily the $CO_2$ and Nd:YAG laser, whereby the rapidly evolving fiber lasers are currently also gaining increasing acceptance in different technical fields.

DE 10 2011 101 700 A1 describes the use of laser strengthening for selectively influencing the deformation behavior of a seat part structure. The aim is to prevent the buckling and breaking of the seat structure in greatly stressed regions of a backrest adjuster particularly in the event of a crash. This is to be achieved by introducing short laser-welded seams in this region. The laser-welded seams by means of the above-described process cause an increase in strength locally in the introduced regions.

It is known that larger components, such as metal sheets, are in a metastable state because of the manufacturing process. The effect known as the "clicker" effect indicates that another stable or metastable state can be assumed with a relatively low force application to the component. The effect often accompanied by a noise indicates tensions in the component. These tensions disadvantageously induce instabilities in the component.

The "clicker effect" occurs particularly in flat components whose width and/or length are considerably greater than their wall thickness, particularly in the case of the mentioned metal sheets. It is also known to occur when metal sheets are used in car body construction and when metal sheets are used in seat structures.

To increase the stability of seat structures, known methods focus on wall thickenings to reduce the motion tolerance of the seat structure.

A drawback of these methods, nevertheless, is that they are cost-intensive and lead to an increased weight of the component modified in this way.

Another approach is the embossing of so-called ribbed structures. The ribbed structures stabilize a flat component without increasing the weight of the component.

SUMMARY OF THE INVENTION

It is therefore an object of the invention to provide a method for a wall-like structure, which eliminates or at least reduces tensions within the wall-like structure and particularly prevents the "clicker effect" occurring in wall-like structures.

A further object is to create a structural component, which is used as a wall-like structure in car body construction or within a seat structure of a vehicle seat and which is free of the negative "clicker effect."

It is clear that, as explained, wall-like structures refer to flat components that are more likely to have a thin wall thickness, so that the "clicker effect" generally occurs in a disadvantageous way.

In particular, a seat structure, particularly a backrest of a vehicle seat or of a bench seat, is to be equipped with a wall-like structure, which is cost-effective and, moreover, does not increase the weight of the seat structure.

The seat pan of a seat part in which such a "clicker effect" is also to be prevented and can also be considered to be a wall-like structure, for example.

The starting point for the invention is a method for the targeted influencing of the deformation behavior of a wall-like structure, particularly a rear wall structure of a vehicle seat, which structure is heated in at least one region at least in sections by a laser light source.

It is provided according to an embodiment of the invention that at least one region influencing the strength and/or tension of the wall-like structure can be selectively chosen and can be lasered to increase the strength of the wall-like structure and/or to reduce the tensions within the wall-like structure.

Special cooling is not necessary in the method, because the desired characteristic physical properties are formed by the self-cooling of the wall-like structure in the desired manner within the material.

A rear wall structure of a vehicle seat in particular, which has at least one laser-strengthened region and, as will still be explained, a reduced-tension region, is created by the use of the method in an advantageous manner.

The invention thus also proposes performing a laser strengthening in a wall-like structure.

During laser strengthening, so-called welding curves are determined depending on the material at a predefinable beam power of the laser source as a function of the welding depth [in mm] and welding speed [in m/min]. These welding curves enable a comparison of the various usable laser sources.

For this reason, laser strengthening is also called laser beam welding, which in the use proposed here is not used to join components to one another by welding but causes a remelting of the material in at least one region, provided for this, of the wall-like structure, particularly a back wall/rear wall of the backrest of the seat structure.

The remelting in a first effect advantageously has the result that an increased strength of the material is achieved in the at least one region.

The remelting in a second effect advantageously has the result that a reduction of tensions within the material is achieved in the at least one region.

In the heat-affected zone of the resulting laser welding tracks, martensite formation similar to classical hardening was determined in higher carbon steel.

The seam structure of the low-carbon steels remains ferritic. The increase in strength occurs by the "quench aging process" in which the carbon remains partially in the $\alpha$-lattice in supersaturated solution due to the rapid cooling and causes an increase in the deformation resistance.

The advantages of using the method are that the laser beam hardening leads to a local increase in strength, especially the yield point in the hardened regions of the seat structure.

Depending on the material, there is an increase in the yield point between 4% and 12%.

The increased local strength in the back wall/rear wall of the backrest of the seat structure leads to an increased energy absorption of about 10% in the event of a crash.

A particular advantage is further that steel parts as well, particularly similar wall-like structures with a lower carbon content can be hardened by laser beam hardening.

The method of the invention advantageously selectively chooses regions on a rear wall structure in which regions laser strengthening reduces or even prevents the component movement responsible for the "clicker effect." The criteria forming the basis for the selective choosing of the regions will be discussed in greater detail below.

The method can be performed in exemplary embodiments of the invention in different steps, whose sequence may be variable, whereby an exemplary variant will be explained after the relevant process steps are indicated.

In an exemplary embodiment of the invention, the wall-like structure can be connected to a support structure, whereby the lasering is performed optionally before, after, or during connection, particularly welding, to the support structure.

The support structure can be, for example, a peripheral profiled frame close to the outer contour of the wall-like structure, which together with the wall-like structure forms, for example, the backrest structure of the backrest of a vehicle seat.

In addition, the support structure can gives the backrest structure an increased stability, necessary for seat structures of a vehicle seat.

In another embodiment of the invention, before or after connection, particularly welding, to the support structure, a ribbed structure having elevations and depressions can be introduced, for example, embedded into the wall-like structure.

In an embodiment of the invention, the elevations and depressions of the ribbed structure can run in a linear manner in the wall-like structure.

The linear elevations and depressions in exemplary embodiments are introduced as straight lines and/or as curves into the wall-like structure. The selection depends on the surface area or wall thickness of the wall-like structure. In practice, further, openings or the like can be located within the wall-like structure, so that the elevations and depressions, technologically simpler to introduce as lines, are replaced or supplemented by elevations and depressions introduced as curves. The explanation makes it clear that the design of the ribbed structure advantageously can be very variable.

The method is notable particularly in that the lasering is performed optionally before or after the introduction of the ribbed structure having elevations and depressions.

The procedure in the mentioned preferred variant is as follows.

In a first step, the ribbed structure is introduced into the wall-like structure. With the introduction of the ribbed structure, there is advantageously a desired increase in stability in the wall-like structure. On the other hand, tensions arise within the material during the embossing of the ribbed structure, said tensions that are the cause of the "clicker effect."

In a second step, the connection to the support structure takes place, particularly to the mentioned profile frame. As explained, the stability of the component assembly having the ribbed structure and comprising the wall-like structure and support structure is advantageously increased still further thereby.

During the connection, particularly the welding of the wall-like structure and the support structure, it also occurs due to the heat input during welding that the wall-like structure within the support structure becomes tensed, so that there is also the resulting risk that the "clicker effect" is initiated in the wall-like structure.

The described approach, however, has the advantage that the ribbed structure of the wall-like structure can also be made in the region where the support structure is attached. The support structure is welded onto the surface or the wall-like structure such that the ribbed structures are arranged below the bearing surface of the support structure.

This design has the effect that the component assembly comprising the wall-like structure and support structure with a ribbed structure taken up to the edge regions of the support structure is especially stable.

As explained, it is also possible in the second step to connect the wall-like structure first to the support structure and to introduce the ribbed structure in a subsequent third step. In this case, however, a ribbed structure may no longer be introduced below the support structure, as a result of which the previously explained effect of the special stability is lost.

In the third step, finally in the wall-like structure at least one laser-welded seam is introduced in the selective region, chosen for this, of the wall-like structure.

The chosen selective region, in other words, is a localizable partial region of the wall-like structure, which is to be given a higher strength and in which arising tensions are to be reduced or are reduced advantageously, so that a "clicker effect" no longer occurs.

The region is chosen depending on the dimensions and/or the wall thickness of the wall-like structure and/or depending on the height of the elevations and/or the depth of the depressions and/or the geometric form of the ribbed structure in the wall-like structure and/or depending on the geometric design of the support structure.

Adherence to the indicated parameters results in a more accurate specification of the arrangement of the ribbed structure and/or the arrangement of the laser-welded seam structure and/or the selection of the welding parameters.

It is provided in an embodiment of the invention that at least one laser-welded seam or a laser-welded seam structure comprising a plurality of laser-welded seams can be lasered into the wall-like structure, whereby the at least one or the plurality of laser-welded seams of the laser-welded seam structure (appropriate for the ribbed structure) can be introduced running linearly as straight lines and/or curves.

In an embodiment, the laser-welded seams can be lasered horizontally and/or vertically onto the elevations and/or into the depressions of the wall-like structure. Such an embodiment will be explained in greater detail as an exemplary embodiment in the following description section.

In another embodiment, it is provided that the elevations and/or depressions of the wall-like structure can be formed diagonal relative to an imaginary horizontal line of the wall-like structure. Similar to this, the at least one laser-welded seam or laser-welded seams based on the imaginary horizontal line are also lasered diagonally into the wall-like structure onto the elevations and/or into the depressions.

Thus, the wall-like structure can have a ribbed structure, which is formed both by substantially vertical and horizontal as well as by diagonally arranged elevations and/or depressions. The at least one laser-welded seam or laser-welded seams is/are then lasered according to the invention onto the elevations or into the depressions.

In the exemplary embodiment described hereafter, the ribbed structure can be formed by substantially vertical and horizontal elevations and depressions, arranged orthogonal to one another. The invention is not limited to this embodiment, however, because the elevations and depressions of the ribbed structure can also be arranged at a predefinable angle to one another within the wall-like structure relative to the imaginary horizontal line of the wall-like structure. The at least one laser-welded seam or laser-welded seams then run then not in the vertical and horizontal elevations, but are also lasered onto the elevations and into the depressions arranged diagonally relative to the imaginary horizontal line.

In other words, the laser strengthening can be performed in an especially advantageous manner in selectively chosen regions only after welding of the rear wall structure to a support structure, particularly to a profile frame.

The warpage possibly arising during the welding of the two components is reduced in an advantageous manner by the introduction of at least one laser-welded seam, as soon as the components have been welded together.

A composite assembly that is more stable and has no "clicker effect" is created in an advantageous manner by the introduction of the at least one laser-welded seam and by the reduction of the warpage. The reduction of the tensions results overall in a reduced warpage of the wall-like structure and thus in a more stable component, particularly based on tendency of the wall-like structure to bend suddenly out of the plane of the wall-like structure, i.e., "clicker effect".

The introduction of the at least one laser-welded seam together with the welding of the support structure to the wall-like structure is of particular advantage, because these steps can be performed in the same tool simultaneously or quickly with one another. There are no costs for the transport from one tool to another tool, costs can be saved by the elimination of a tool and transport equipment, and the production time is reduced.

The introduction of the ribbed structure into the wall-like structure, particularly the embossing of the ribbed structure, therefore occurs in an advantageous manner before the welding of the rear wall structure to the support structure.

In an embodiment of the invention, in some exemplary embodiments horizontal and vertical ribs are run in chosen regions over the entire surface of the wall-like structure, particularly the rear wall structure.

Earlier welding of the support structure to the rear wall structure would prevent embossing in terms of ribbing of the rear wall structure in the region of the support structure. The stabilization could therefore only be achieved in the interior of the support structure.

An advantage of the later introduction of the laser-welded seam structure into the rear wall structure is that by the introduction of the ribbed structure and by the welding process during the connection of the rear wall structure to the support structure, induced tensions in the material can be reduced later by the subsequent laser welding.

The wall-like structure forming within the method is explained in detail in the description.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the text below, the terms horizontal (from left to right) and vertical (from top to bottom) refer, for example, to a course of laser-welded seams 21, 22 and ribs 11, 12 in the plane of the rear wall structure in relation to the position of rear wall structure 10 shown in the figures.

Figure 1A:
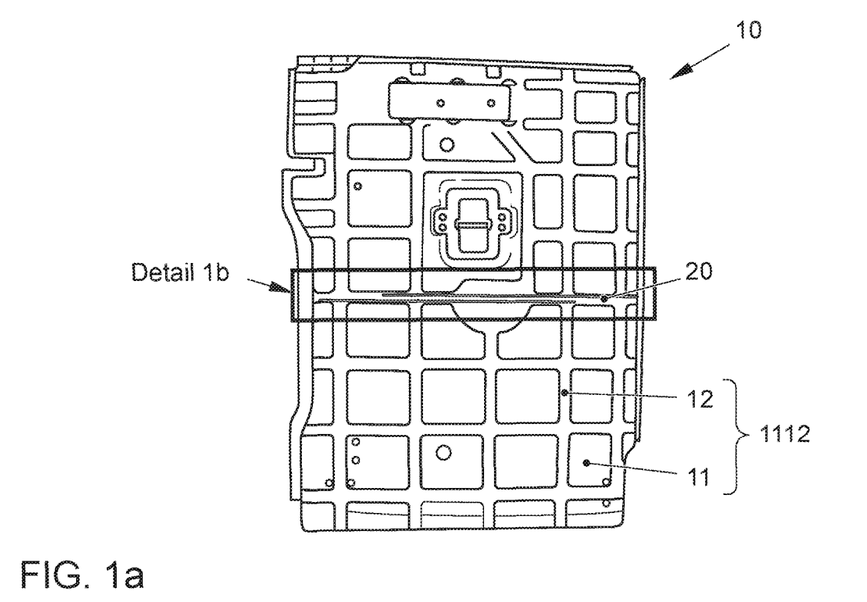
FIGS. 1a and 1b show a course of laser-welded seams on a rear wall structure of a vehicle seat according to an embodiment of the invention.

FIG. 1a shows by way of example the side, facing away from the upholstery, of a rear wall structure 10 of a vehicle seat F or a bench seat or a bench seat, comprising a plurality of vehicle seats F, in a motor vehicle.

Figure 2A:
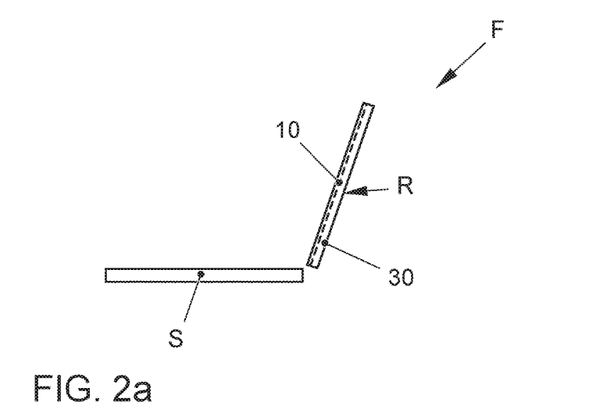
FIG. 2a shows a vehicle seat with a seat part and a backrest part, whereby the backrest part has a wall-like structure with a support structure.

FIG. 2a shows a schematically illustrated vehicle seat F. It comprises a seat part S and a backrest R, whereby the wall-like structure is a rear wall structure 10 of backrest part R. Rear wall structure 10 is connected to a support structure 30, particularly a profile frame.

The invention will be described in greater detail with reference to the rear wall structure 10, which is connected to support structure 30.

A ribbed structure 1112 embossed into the metal sheet of rear wall structure 10 can be seen in FIG. 1a. Ribbed structure 1112 runs both vertically and horizontally.

Elevations 11 and depressions 12 of the ribbed structure in the exemplary embodiment are arranged orthogonal to one another within rear wall structure 10.

Cut-outs for seat belt attachment, backrest adjustment, and attachment of rear wall structure 10 are shown in the left top edge region, in the right bottom edge region, and in the middle upper region.

In a selected middle region, two horizontal laser-welded seams 21, introduced in the shape of lines in rear wall structure 10, run parallel to one another.

In the initial example, horizontal laser-welded seams 21 run virtually over the entire width of rear wall structure 10.

Figure 1B:
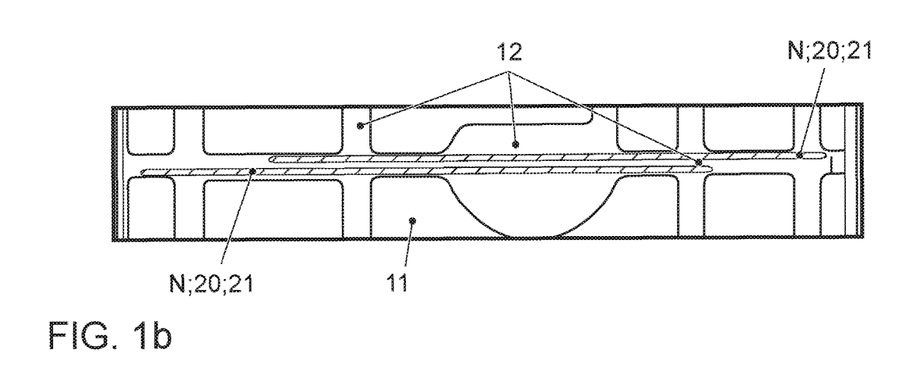

A detail enlargement of rear wall structure 10 is shown in FIG. 1b.

It can be seen by means of the enlargement that elevations 11 and depressions 12 of ribbed structure 1112 are each introduced close to the side edge of rear wall structure 10.

FIG. 1b shows, furthermore, that two horizontal laser-welded seams 21 (shown hatched) are run from an edge region over the middle region of rear wall structure 10. Two horizontal laser-welded seams 21 are arranged one above the other at a small distance to one another in the middle region of rear wall structure 10.

Rear wall structure 10 in a selectively chosen region is strengthened by the arrangement of the two laser-welded seams 21, whereby laser-welded seams 21, 22 in an embodiment of the invention are arranged within elevation 11 of ribbed structure 1112. They exert the effects described below very effectively there, as tests have shown.

The selectively chosen region of the laser-welded seam structures in this exemplary embodiment was chosen in a targeted manner over the entire width of rear wall structure 10.

This arrangement has the result that rear wall structure 10 is strengthened over the entire width.

The strengthening is the greatest in the middle region due to the arrangement of the two horizontal laser-welded seams 21 one above the other, so that the greater tensions present in this middle region of rear wall structure 10 are prevented.

The strength, particularly the bending strength of rear wall structure 10 in the middle of the rear wall structure is enhanced, on the one hand, by the laser strengthening in this region in an advantageous manner by the arrangement of the two horizontal laser-welded seams 21 one above the other.

On the other hand, a heat input in the region, critical due to tension, of rear wall structure 10 occurs twice here by the introduction of heat by two laser-welded seams 21 lying very closely next to one another.

This heating by the laser light source advantageously leads to a relaxation of the material structure of the illustrated rear wall structure 10 in the selected region.

The laser strengthening lines can be introduced in the middle and/or at the edges in a ribbed structure 1112 in the selectively chosen region.

The stabilizing effects of ribbed structure 1112 and laser-welded seam structure 20 are mutually strengthened thereby by the laser strengthening.

It is provided that elevations 11 and depressions 12 of ribbed structure 1112 within rear wall structure 10 and horizontal and vertical laser-welded seams 21, 22 within rear wall structure 10 are arranged in each case orthogonal to one another.

In an embodiment of the invention, a ribbed structure 1112 and a plurality of laser-welded seam structures 20 can be arranged on a rear wall structure 10.

The plurality of laser-welded seam structures 20 creates geometric forms, particularly laser-welded seams which are parallel to one another and are arranged at right angles to one another, particularly rectangles.

Figure 2B:
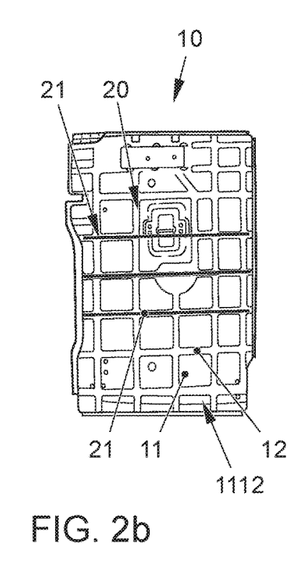
FIGS. 2b, 2c, and 2d show laser-welded seam structures.
Figure 2C:
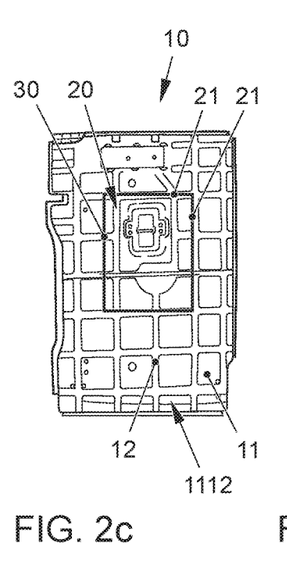
Figure 2D:
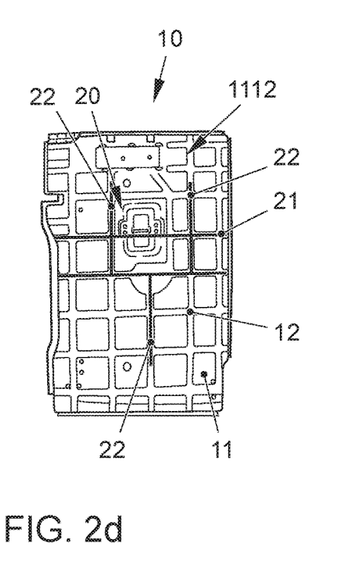

Other possible arrangements of ribbed structures 1112 and associated laser-welded seam structures 20 are shown in an exemplary selection of three possible variants in FIGS. 2b to 2d and are described hereafter.

Shown are three schematic illustrations of rear wall structures 10 according to FIG. 1.

FIG. 2b shows in a first variant three horizontal laser-welded seams 21, parallel to one another and lying one above the other, as laser-welded seam structure 20, which in each case run over the entire width of rear wall structure 10 and are arranged each in a horizontally running depression 12 (rib depression) of ribbed structure 1112.

FIG. 2c in a second variant shows a laser-welded seam structure 20, introduced by laser strengthening. It is located in the central region of rear wall structure 10 and is made as a rectangle of two horizontal laser-welded seams 21, running parallel to one another, and two vertical laser-welded seams 22, substantially perpendicular thereto and likewise running parallel to one another. The horizontal and vertical laser-welded seams 21, 22 have their starting point and endpoint at an intersection or contact point of two lines.

In a third variant according to FIG. 2d, the horizontally running laser strengthening lines 21 extend beyond the points of intersection. Together with the vertically running laser-welded seams 22, they form a rectangle as in FIG. 2c, which is close to the center of rear wall structure 10, but in the top middle region of rear wall structure 10.

However, the points of contact of vertical laser-welded seams 22 with the lower horizontal laser-welded seam 21 represent the starting point of vertical laser strengthening lines 21.

Structure 20 shown in FIG. 2d by means of the laser strengthening alone or in combination with the shown ribbed structure 1112 represents an especially preferred variant, because it was determined that crossing laser-welded seams 21, 22 of laser-welded seam structure 20 affect especially advantageously the total strength of rear wall structure 10 and the reduction of tensions in rear wall structure 10.

All possible variants of the invention as shown in FIGS. 2b to 2d have in common that they strengthen selectively chosen regions of rear wall structure 10.

The arrangement of laser-welded seams 21, 22 by means of their position, preferably on elevations 11 of ribbed structure 1112, their length, and/or arrangement to one another within rear wall structure 10, has a strengthening effect on the entire rear wall structure 10.

The arrangement of laser-welded seams 21, 22 in depressions 12 of ribbed structure 1112 is also conceivable according to the invention.

Laser-welded seams 21, 22, particularly in a preferred embodiment of the invention, are arranged parallel to the inner contour of support structure 30, that is, running parallel to the inner contour of the profile frame. This design is especially advantageous, because the lines of action of support structure 30 run parallel to the lines of action of laser-welded seams 21, 22.

In particular, the bending strength of rear wall structure 10 is greatly increased thereby.

Moreover, at least some of the horizontal and vertical laser-welded seams 21, 22 are arranged so that during the strengthening process they heat the material in selected regions by means of a laser light source. The selected regions are chosen so that the regions characterized by undesirable tensions are treated with heat, whereby these tensions are reduced during the heating by laser welding.

Figure 3A:
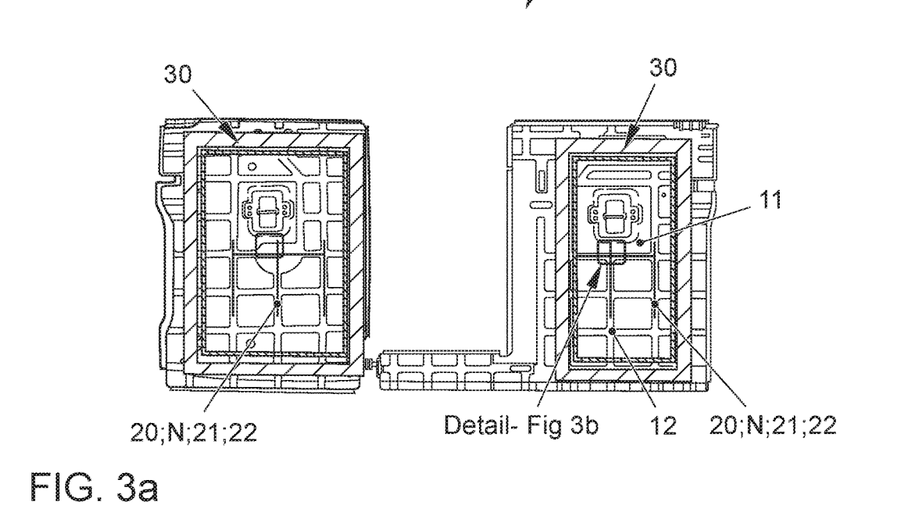
FIGS. 3a and 3b show an exemplary embodiment of the arrangement of a support structure on a rear wall structure and a ribbed structure and a laser-welded seam structure arranged thereon.
Figure 3B:
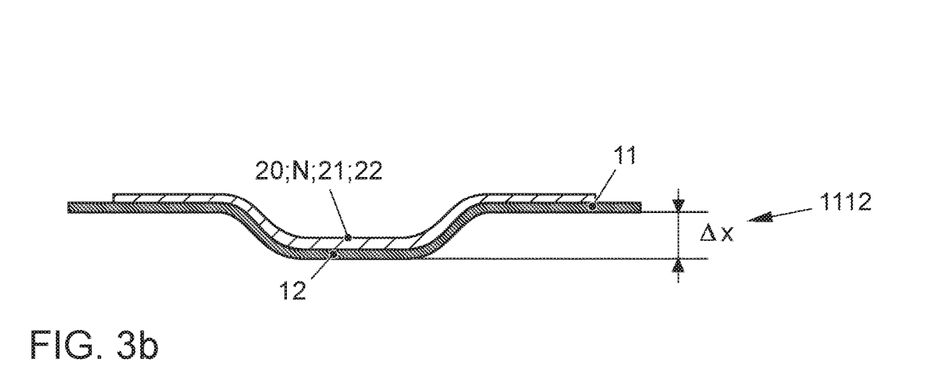

In an embodiment of the invention, shown in FIGS. 3a and 3b, it is provided that laser-welded seam structure 20 is arranged within the support structure, particularly profile frame 30.

FIG. 3a in this regard shows schematically two rear wall structures 10, connected to one another, on the side facing away from upholstery.

As in FIGS. 1a, 1b and 2b to 2d, a ribbed structure 1112 is introduced, which in the shown exemplary embodiment was created by rib embossing.

The laser-welded seam structure 20 introduced by means of the laser strengthening corresponds to the exemplary embodiment according to FIG. 2d.

The difference between FIGS. 2c and 3a is that rear wall structure 10 in the exemplary embodiment according to FIG. 3a is connected to profile frame 30 as a support structure.

It is mentioned at this point that other profile frames as well, which have only one top and bottom opposite support structure 30 of profiles or a support structure arranged opposite to the left and right, can be connected to rear wall structure 10. As explained, ribbed structures 1112 or laser-welded seam structures 20 are adapted to this modified support structure 30; that is, other geometric arrangements are optionally formed for laser-welded seam structures 20, which have not been described in greater detail here.

Laser-welded seam structure 20 due to the laser strengthening in this exemplary embodiment is located within support structure 30; that is, laser-welded seams N; 21, 22 do not extend beyond the inner contour of support structure 30.

It is particularly made clear in FIGS. 3a, 3a that ribbed structure 1112 is formed in the bearing surface of profile frame 30 on the rear wall structure and even peripherally projects over the outer contour of profile frame 30, as a result of which the ribbed structure is visible beyond profile frame 30.

It was already explained that this arrangement is possible, because ribbed structure 1112 was introduced before the attachment of profile frame 30 to rear wall structure 10.

In a sectional illustration through rear wall structure 10, ribbed structure 1112, particularly a depression 12 (rib depression) and thereto an elevation 11 (rib elevation) in the wall-like structure, is shown in FIG. 3b. A distance $\Delta x$ of 2 mm, for example, is selected between a depression and elevation. The wall thickness of rear wall structure 10, therefore of the metal sheet, is, for example, about 0.5 mm.

Shown is the alternative course of a laser-welded seam N; 21, 22, which is shown hatched analogous to FIG. 1b; unlike in the previous FIGS. 1a, 1b, 2b, 2c, 2d, it runs orthogonal to depression 12 and runs onto an adjacent elevation 11 of ribbed structure 1112 on one side or, as shown in FIG. 3b, onto an adjacent elevation 11 of ribbed structure 1112 on both sides.

It can be assured likewise advantageously by this orthogonal course that the strengthening effects of ribbed structure 1112 and laser-welded seam structure 20 due to the laser strengthening overlap and strengthen further, so that the "clicker effect" is prevented.

The particular horizontal or vertical laser-welded seam N; 21, 22 in this embodiment runs orthogonal to at least one depression 12 onto at least one elevation 11 or even beyond the at least one elevation 11 to next depression 12, in which the particular horizontal or vertical laser-welded seam N; 21, 22 continues and again crosses the particular depression 12 orthogonally.

The orthogonal crossing of one or more depressions 12 or one or more elevations 11 of a laser-welded seam or a plurality of laser-welded seams N; 21, 22, as shown in FIG. 3b, also represents only one variant, however.

It is also provided in other variants that one or more laser-welded seams N; 21, 22 cross one or more depressions 12 or one or more elevations 11 not orthogonally but at a predefinable angle. The one or the plurality of laser-welded seams N; 21, 22 in these variants therefore do not run in depressions 12 and/or on elevations 12, but cross depressions 12 and/or elevations 12 at a predefinable angle, preferably orthogonally.

The already mentioned course of ribbed structure 1112 beyond support structure 30, that is, below support structure 30, in each embodiment advantageously enables stabilization of the regions of rear wall structure 10, which regions project on the edges beyond support structure 30.

It is necessary for this purpose to arrange ribbed structure 1112, as explained, before the welding of rear wall structure 10 to profile frame 30.

Laser-welded seam structure 20 in the preferred process is introduced after the welding to profile frame 30.

The warpage, not to be prevented totally in the welding process during the connection of profile frame 30 to rear wall structure 10 and/or during the introduction of ribbed structure 1112, is greatest within the inner contour of the profile frame, because this is a closed region, which permits no relaxation in a direction lying in the plane of rear wall structure 10. The warpage can therefore be relaxed only orthogonally to the plane, as a result of which the "clicker effect" occurs, which is advantageously prevented by this invention, however.

The introduction of a laser-welded seam structure 20 by laser strengthening by the method of the invention necessarily leads to a heating of critical regions and thus to a reduction of warpage. Moreover, the laser-strengthened regions are hardened and by the selection of the arrangement of laser-welded seam structure 20 by means of the laser strengthening strengthen the entire region in the interior of support structure 30. The sum of the described effects makes the occurrence of a so-called "clicker effect" virtually impossible.

Apart from the arrangement of laser-welded seam structure 20 by means of laser strengthening, the parameters for introducing the structure are critical for the combination of strengthening and relaxation of the entire rear wall structure.

Critical process-engineering welding parameters in this case are the type of laser source, the power of the laser source, the focal spot diameter or defocus, the laser travel speed (rate of advance v), and the depth E and width of the strengthening track.

A possible combination provides for the operation of an Nd:YAG laser (type of laser source) with a 4 kW burning power and a defocus of 30 mm.

Figure 4:
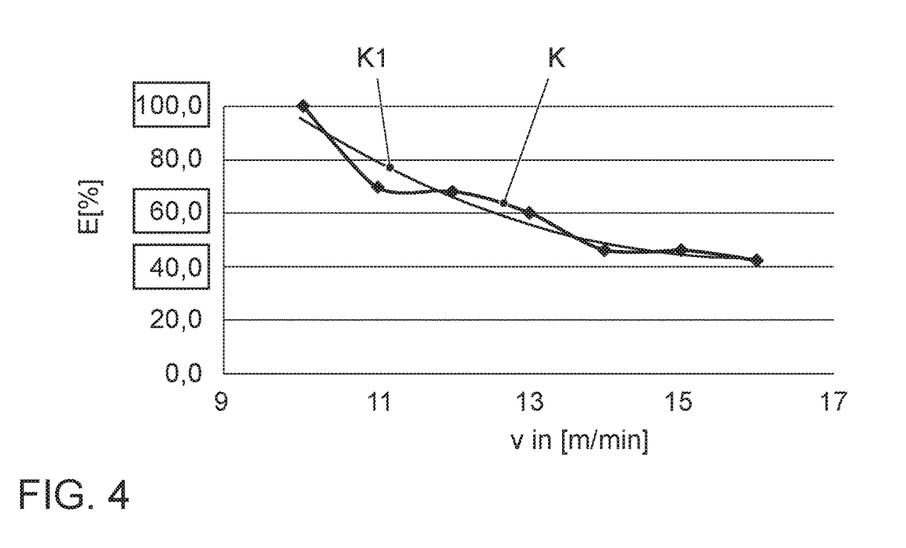
FIG. 4 shows a relationship of two selected parameters in the laser welding process for creating strengthening lines on a wall-like structure, the rear wall structure.

FIG. 4 shows the effect of the travel speed or rate of advance v of such a laser on the welding depth E during laser strengthening of a material HC300X, mentioned by way of example, in a 0.5 mm wall thickness based on a characteristic K and an associated interpolated characteristic K1.

In order to produce the described positive and desired properties of the method of the invention, there can be especially no burn-through (E=100%) through the particular material.

Laser-welded seam structure 20 can be introduced on one side or on both sides of rear wall structure 10.

Rear wall structure 10, lasered according to the method of the invention, therefore has at least one laser-welded seam N; 21, 22 on at least one side or on both sides.

For an optimal result, a minimum penetration depth of E=50% should be produced.

In laser welding on both sides, the laser-welded seams N; 21, 22 are to be formed in different regions, because otherwise a burn-through of laser-welded seams 21, 22 may occur.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for a targeted influencing of a deformation behavior of a wall-like structure, the method comprising:
    selectively choosing at least one region of the wall-like structure that influences a strength and/or tension of the wall-like structure; and
    lasering at least one section in the at least one region selectively chosen, via a laser light source, to increase the strength of the wall-like structure and/or to reduce the tension within the wall-like structure,
    wherein, during the lasering, at least one laser-welded seam or a laser-welded seam structure comprising a plurality of laser-welded seams is lasered into the wall-like structure,
    wherein the wall-like structure is connected to a support structure,
    wherein, before the connection or welding of the wall-like structure to the support structure, a ribbed structure is introduced or embossed into the wall-like structure,
    wherein the lasering is performed before or after the introduction of the ribbed structure having the elevations and depressions into the wall-like structure,
    wherein the support structure is a profile frame, an inner contour of the profile frame framing an area of the wall-like structure, and
    wherein the at least one laser-welded seam or the laser-welded seam structure is located at least within the area of the wall-like structure that is framed by the profile frame.

2. The method according to claim 1, wherein the lasering is performed before, after, or during connection or welding of the wall-like structure to the support structure.

3. The method according to claim 2, wherein, the ribbed structure includes elevations and depressions, wherein the structure of the elevations and depressions is predefinable, and wherein the elevations and depressions are formed substantially linear and introduced running as substantially straight lines or as curves.

4. The method according to claim 1, wherein the wall-like structure is a rear wall structure of a vehicle seat.

5. The method according to claim 1, wherein the at least one laser-welded seam or the structure of the plurality of laser-welded seams of the laser-welded seam structure is predefinable, wherein the at least one laser-welded seam or the plurality of laser-welded seams are formed in the shape of lines and are introduced running as straight lines or as curves.

6. The method according to claim 5, wherein the at least one laser-welded seam or the plurality of laser-welded seams, are lasered substantially horizontally and/or vertically and/or diagonally relative to an imaginary horizontal line into the wall-like structure, wherein the horizontal and/or vertical and/or diagonal laser-welded seams are lasered onto or into elevations and/or depressions of the wall-like structure which are arranged horizontally and/or vertically and/or diagonally relative to the imaginary horizontal line.

7. The method according to claim 1, wherein the at least one region influencing the strength and/or the tension of the wall-like structure preps selectively chosen based on:
    dimensions and/or a wall thickness of the wall-like structure; and/or
    a height of elevations and/or a depth of depressions and/or a geometric form of a ribbed structure in the wall-like structure; and/or
    a geometric design of a support structure that is connected to the wall-like structure.

8. A wall-like structure, comprising:
    a selectively chosen region having at least one laser-welded seam or a laser-welded seam structure that is generated by a laser light source of a laser device,
    wherein the at least one laser-welded seam increases a strength of the wall-like structure, and/or reduces tensions in the wall-like structure,
    wherein the wall-like structure is a rear wall structure of a seat structure of a vehicle seat,
    wherein the wall-like structure has a ribbed structure,
    wherein a support structure is connected to the wall-like structure,
    wherein the support structure is a profile frame, an inner contour of the profile frame framing an area of the wall-like structure, and
    wherein the at least one laser-welded seam or the laser-welded seam structure is located at least within the area framed by the profile frame.

9. The wall-like structure according to claim 8, wherein the at least one laser-welded seam or the laser-welded seam structure is formed in the wall-like structure.

10. The wall-like structure according to claim 9, wherein the at least one laser-welded seam, based on an arrangement on the wall-like structure, is at least one horizontal laser-welded seam or at least one vertical laser-welded seam or at least one laser-welded seam diagonal relative to an imaginary horizontal line, and wherein the laser-welded seam structure has horizontally running laser-welded seams and/or vertically running laser-welded seams and/or laser-welded seams running diagonally relative to the imaginary horizontal line.

11. The wall-like structure according to claim 10, wherein the ribbed structure has elevations and depressions.

12. The wall-like structure according to claim 11, wherein the ribbed structure having the elevations and depressions within the wall-like structure and the at least one laser-welded seam or the laser-welded seam structure within the wall-like structure are arranged parallel or at a predefinable angle to one another, wherein the ribbed structure having the elevations and depressions within the wall-like structure and the at least one laser-welded seam or the laser-welded seam structure are arranged orthogonally to one another.

13. The wall-like structure according to claim 11, wherein the at least one laser-welded seam or the laser-welded seam structure are arranged on the elevations and/or in the depressions of the wall-like structure.

14. The wall-like structure according to claim 11, wherein the at least one laser-welded seam or the laser-welded seam structure are arranged at a predefinable angle that is orthogonal to the elevations and/or in the depressions of the wall-like structure.

15. A backrest part and/or seat part of a vehicle seat comprising a wall-like structure produced by the method according to claim 1.

\* \* \* \* \*